(12) United States Patent
Iwao et al.

(10) Patent No.: US 8,360,932 B2
(45) Date of Patent: Jan. 29, 2013

(54) LOCKUP CLUTCH CONTROL DEVICE FOR VEHICLE

(75) Inventors: Nobuyuki Iwao, Kanagawa (JP); Shuuji Taguchi, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 932 days.

(21) Appl. No.: 12/312,459

(22) PCT Filed: Nov. 19, 2007

(86) PCT No.: PCT/JP2007/072374
§ 371 (c)(1),
(2), (4) Date: May 12, 2009

(87) PCT Pub. No.: WO2008/062751
PCT Pub. Date: May 29, 2008

(65) Prior Publication Data
US 2010/0004091 A1    Jan. 7, 2010

(30) Foreign Application Priority Data
Nov. 24, 2006    (JP) .................................. 2006-317724

(51) Int. Cl.
*B60W 10/02* (2006.01)
*B60W 10/04* (2006.01)
(52) U.S. Cl. ........................... 477/181; 477/62; 477/180
(58) Field of Classification Search .................. 477/166, 477/168, 169, 173–175, 181, 180, 53, 54, 477/62
See application file for complete search history.

(56) References Cited

U.S. PATENT DOCUMENTS

| 5,626,536 | A | * | 5/1997 | Kono et al. | 477/181 |
| 5,868,552 | A | * | 2/1999 | McKean et al. | 415/158 |
| 6,435,167 | B1 | * | 8/2002 | Finger et al. | 123/568.12 |
| 6,652,414 | B1 | * | 11/2003 | Banks, III | 477/32 |
| 7,316,631 | B2 | * | 1/2008 | Tsunekawa | 477/62 |
| 2003/0109359 | A1 | * | 6/2003 | Eguchi et al. | 477/174 |
| 2004/0204290 | A1 | * | 10/2004 | Ito | 477/175 |
| 2007/0111853 | A1 | * | 5/2007 | King et al. | 477/109 |

(Continued)

FOREIGN PATENT DOCUMENTS

| JP | 8-72590 | 3/1996 |
| JP | 8-170724 | 7/1996 |

(Continued)

OTHER PUBLICATIONS

Japanese Office Action dated Mar. 23, 2012.

*Primary Examiner* — Justin Holmes
(74) *Attorney, Agent, or Firm* — McGinn IP Law Group, PLLC (57) ABSTRACT

In a vehicle mounting an engine equipped with an exhaust turbocharger and a fluid transmission device as the power transmission device, occurrence of surging in the exhaust turbocharger is prevented at the time of connecting a lockup clutch in the fluid transmission device. When a condition for connecting the lockup clutch is held to lock up the fluid transmission device coupled to the engine 1 equipped with the exhaust turbocharger, the operation is executed by lowering a target engine rotational speed for a predetermined period of time prior to the locking up to avoid the occurrence of surging caused by a decrease in the engine rotational speed due to the lockup. A lockup clutch control device 50 includes first timer means 51 for setting a time for executing the operation by decreasing the target engine rotational speed, and second timer means 52 for setting a time for waiting for the start of lockup.

8 Claims, 6 Drawing Sheets

U.S. PATENT DOCUMENTS

2007/0207893 A1 9/2007 Iwao et al.
2008/0147299 A1* 6/2008 Haraguchi .................... 701/103

FOREIGN PATENT DOCUMENTS

| JP | 9-53717 | 2/1997 |
| JP | 2005-260505 A | 9/2005 |
| JP | 2005-265050 | 9/2005 |
| JP | 2007-064376 | 3/2007 |

* cited by examiner

PRIOR ART

LOCKUP CLUTCH CONTROL DEVICE FOR VEHICLE

TECHNICAL FIELD

This invention relates to a lockup clutch control device for a vehicle in which a transmission is coupled to the output shaft of an engine equipped with an exhaust turbocharger via a fluid transmission device such as a fluid coupling, and a lockup clutch is incorporated in the fluid transmission device to directly couple a pump and a turbine together in the fluid transmission device, the lockup clutch control device being so constituted as to control the lockup clutch and the engine.

BACKGROUND ART

A patent document 1 (JP-A-2005-265050) filed by the present applicant is proposing a technology related to a vehicle having a power transmission device in which a clutch and a transmission are coupled to the output shaft of an engine equipped with an exhaust turbocharger via a fluid coupling in order to connect/disconnect the transmission of power from the engine side to the transmission side by connecting/disconnecting the clutch, the fluid coupling incorporating a lockup clutch for directly coupling a pump and a turbine together.

In this power transmission device, a pump of the fluid coupling is coupled to the output shaft (crankshaft) of the engine equipped with the exhaust turbocharger, the turbine driven by the fluid torque produced by the pump is coupled to the input shaft of the clutch, and slippage between the pump and the turbine is utilized at the start of the vehicle to attain a smooth start. At the start, the clutch is connected, and the input shaft of the clutch coupled to the turbine of the fluid coupling is directly coupled to the input shaft of the transmission.

Upon attaining a preset low vehicle speed after the start of the vehicle, a lockup clutch control device connects the lockup clutch so as to couple the output shaft of the engine to the input shaft of the clutch in order to avoid loss that accompanies the transmission of power in the case of utilizing a fluid in the fluid coupling.

Figure 5:
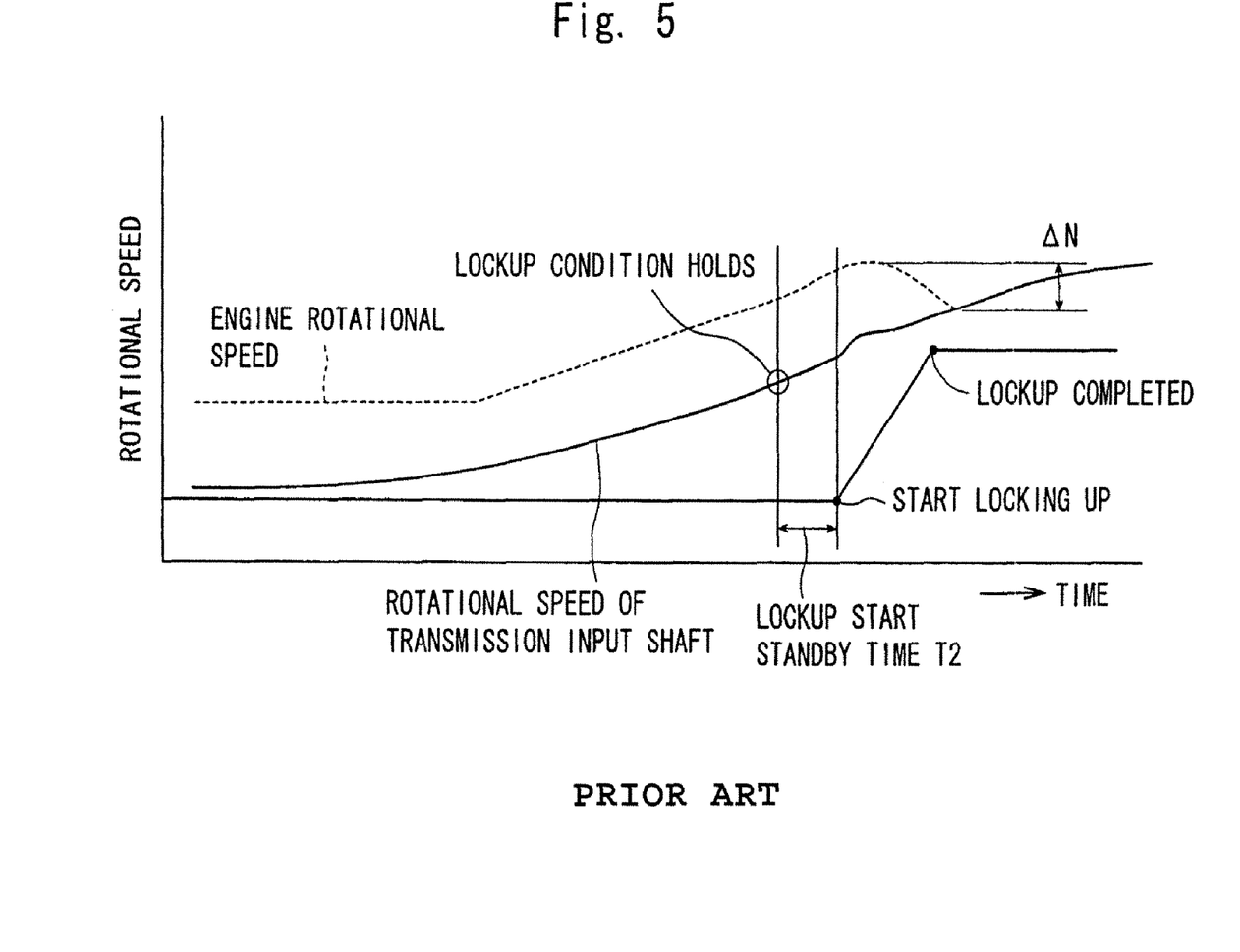
FIG. 5 is a diagram of control timings of a control device according to a prior art.

FIG. 5 is a diagram of lockup clutch control timings in an operation control device of a vehicle equipped with a lockup clutch for directly coupling a pump and a turbine together in a fluid coupling between an engine equipped with an exhaust turbocharger and a clutch such as one disclosed in the above patent document 1.

Referring to FIG. 5, after the operation via the fluid coupling for starting the vehicle, the rotational speed of the transmission input shaft (which is proportional to the vehicle speed and is equal to the rotational speed of the turbine of the fluid coupling) reaches a rotational speed holding the condition for connecting the lockup clutch (e.g., about 900 RPM), whereby the lockup clutch control device produces a lockup clutch connection instruction. Therefore, the lockup clutch is connected, and the output shaft of the engine is directly coupled to the input shaft of the clutch.
Patent document 1: JP-A-2005-265050

DISCLOSURE OF THE INVENTION

Problems that the Invention is to Solve

However, the control device for a vehicle mounting the engine equipped with the exhaust turbocharger disclosed in the above patent document 1 is accompanied by problems that must be solved as described below.

That is, when the rotational speed of the transmission input shaft reaches a rotational speed holding the condition for connecting the lockup (e.g., about 900 RPM), the vehicle control device connects the lockup clutch. Here, if the load for driving the vehicle is large, the engine rotational speed (rotational speed of the pump of the fluid coupling) will have been elevated to a rotational speed (e.g., about 1500 RPM) which is considerably higher than the rotational speed (e.g., about 900 RPM) for holding the lockup connection condition just before the lockup clutch is connected. This is because if the load for driving the vehicle is large, a large torque must be transmitted from the pump to the turbine in the fluid coupling, and the engine is operated carrying a large load so that a difference in the rotational speed increases between the pump and the turbine. If the lockup clutch is connected in this state, the load of the power transmission system succeeding the clutch and the transmission is abruptly exerted on the engine, and the engine rotational speed sharply decreases (down to, for example, 500 to 600 RPM) as represented by ΔN in FIG. 5.

If the rotational speed of the engine equipped with the exhaust turbocharger suddenly decreases while it is being charged by the exhaust turbocharger, the intake air pressure at the outlet of the exhaust turbocharger sharply rises to a level that does not match with the engine rotational speed after the sharp decrease.

In recent years, however, a variable capacity exhaust turbocharger has been widely used for improving the charging efficiency to improve the engine fuel efficiency (to decrease fuel consumption) by varying the charging capacity (varying the turbine nozzle angle) depending upon the operating conditions on the engine side, such as the engine load, engine rotational speed and the like.

The variable capacity exhaust turbocharger, however, cannot release part of the exhaust gas unlike the generally used exhaust turbocharger equipped with a waste gate valve. Therefore, it is difficult to avoid a sharp increase in the intake air pressure; i.e., the intake air pressure sharply increases at the outlet of the exhaust turbocharger as described above often causing the exhaust turbocharger to plunge into a region of unstable operation, i.e., a surging region.

Figure 6:
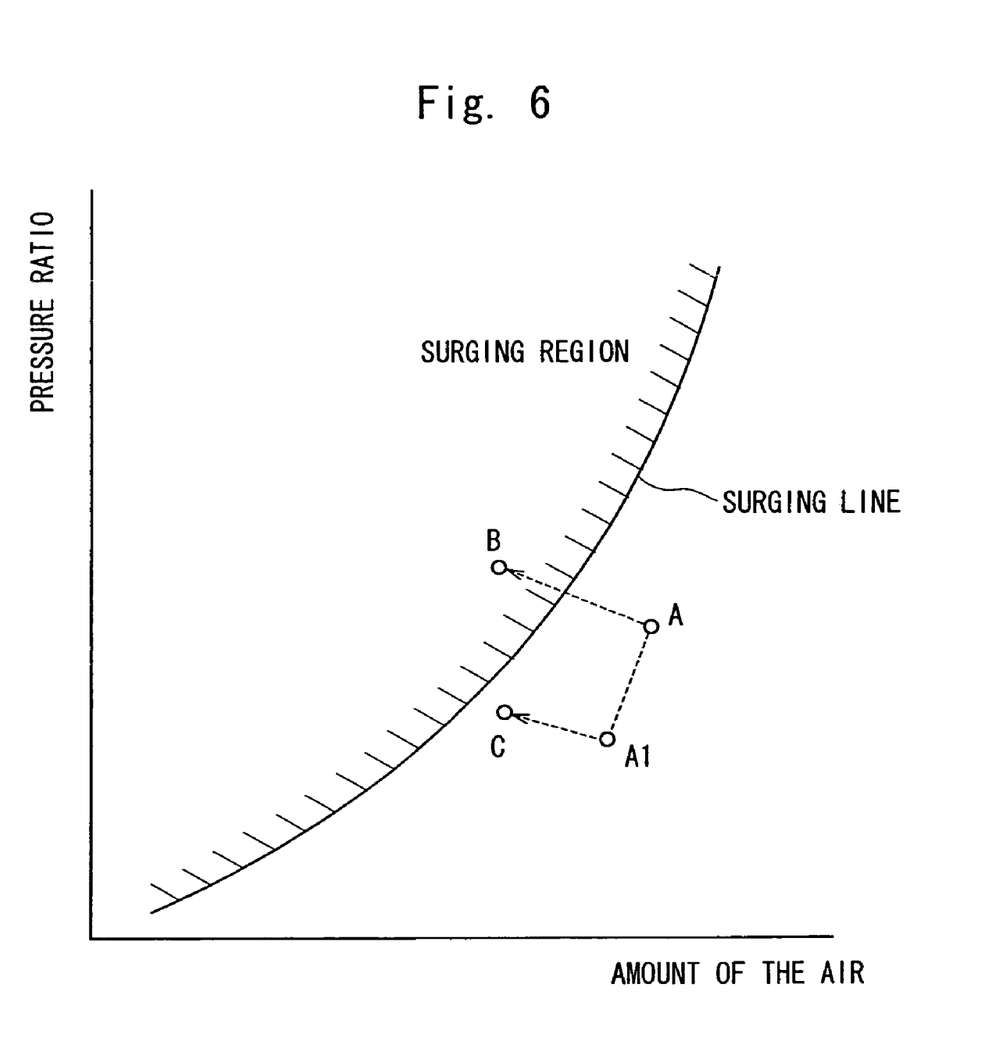
FIG. 6 is a diagram of operation of the exhaust turbocharger according to the present invention.

FIG. 6 illustrates a general surging line in a diesel engine equipped with an exhaust turbocharger.

In FIG. 6, if the rotational speed of the engine sharply decreases from the state where it was running at an operation point A being charged by the exhaust turbocharger due to the connection of the lockup clutch as described above, the engine requires the air in a decreased amount while the intake air pressure increases at the outlet of the compressor of the exhaust turbocharger (pressure ratio increases in FIG. 6). Therefore, the operation point of the compressor in the exhaust turbocharger shifts to a point B in the surging region where the surging may easily occur.

Therefore, with the engine equipped with the above-mentioned variable capacity exhaust turbocharger, in particular, a plunge into the surging region causes an increase in the noise such as surge noise or the degree of surging giving rise to the occurrence of breakage of compressor vanes and turbine vanes in the exhaust turbocharger.

In view of the above problem inherent in the prior art, the present invention has an object of providing a lockup clutch control device for a vehicle mounting an engine equipped with an exhaust turbocharger in order to prevent the occurrence of surging in the exhaust turbocharger, occurrence of noise caused thereby and occurrence of breakage of the compressor vanes in the exhaust turbocharger, that is caused by a sudden decrease in the engine rotational speed due to a sudden increase in the engine load of when the lockup clutch is connected.

Means for Solving the Problems

In order to achieve the above object, the present invention provides "a lockup clutch control device mounted on a vehicle in which a transmission is coupled to the output shaft of an engine equipped with an exhaust turbocharger via a fluid transmission device, and a lockup clutch is incorporated in the fluid transmission device to directly couple a pump and a turbine together in the fluid transmission device, the lockup clutch control device comprising a first timer means for setting a rotational speed decrease control time for operating the engine by decreasing a target rotational speed when a condition for connecting the lockup clutch is held, and a second timer means for setting a lockup start standby time from when the condition for connecting the lockup clutch is held until when the lockup clutch starts connecting.

As described in claim 2, the present invention is desirably applied to a vehicle which uses a fluid coupling as the fluid transmission device. As described in claim 3, further, the invention can be desirably applied to a vehicle mounting an engine equipped with a variable capacity exhaust turbocharger.

Effects of the Invention

According to the present invention, when the rotational speed of the transmission input shaft reaches a rotational speed for holding the condition for connecting the lockup clutch, the lockup clutch control device outputs a control instruction to the engine control device of the engine equipped with the exhaust turbocharger so as to execute the operation by decreasing a target engine rotational speed down to a preset rotational speed, and actuates the first timer means to set a rotational speed decrease control time for executing the operation by decreasing the target rotational speed down to the preset rotational speed after the condition for connection is held.

In the rotational speed decrease control time set by the first timer means, the engine control device produces a control instruction to the engine to lower the target rotational speed. In response to the control instruction, the fuel is fed in a decreased amount to the engine to decrease the output, and the real rotational speed of the engine gradually decreases (or, after the lockup clutch connection condition is held, the engine rotational speed increases in a greatly suppressed manner as compared to the prior art). The energy of the exhaust gas acting on the exhaust turbocharger decreases with a decrease in the engine rotational speed and output. Therefore, the intake air pressure and the intake air flow rate to the engine produced by the compressor of the exhaust turbocharger decrease prior to connecting the lockup clutch (operation point shifts from A to A1 in FIG. 6).

In addition to the rotational speed decrease control, further, the lockup clutch control device actuates the second timer means to set a lockup start standby time from when the condition for connecting the lockup clutch is held until when the lockup clutch starts connecting. Even if the engine rotational speed would have been further decreased due to the lockup (operation point shifts from A1 to C in FIG. 6) at the start of lockup set by the second timer means, the rotational speed of the compressor of the exhaust turbocharger has been decreased down to a rotational speed that does not plunge into the surging region that is caused by an increase in the pressure in the engine intake air system. Namely, the lockup clutch is connected at a moment of a suitable engine rotational speed that is not adversely affected by the lockup.

Unlike that of the prior art, therefore, the exhaust turbocharger is prevented from plunging into the surging region that is caused by a sharp decrease in the engine rotational speed and an increase in the pressure in the engine intake air system at the time when the lockup clutch is connected, occurrence of noise such as surging noise due to surging is prevented, and the compressor vanes and the turbine vanes in the exhaust turbocharger are prevented from being broken down.

BEST MODE FOR CARRYING OUT THE INVENTION

An embodiment of the invention will now be described in detail with reference to the drawings.

Figure 3:
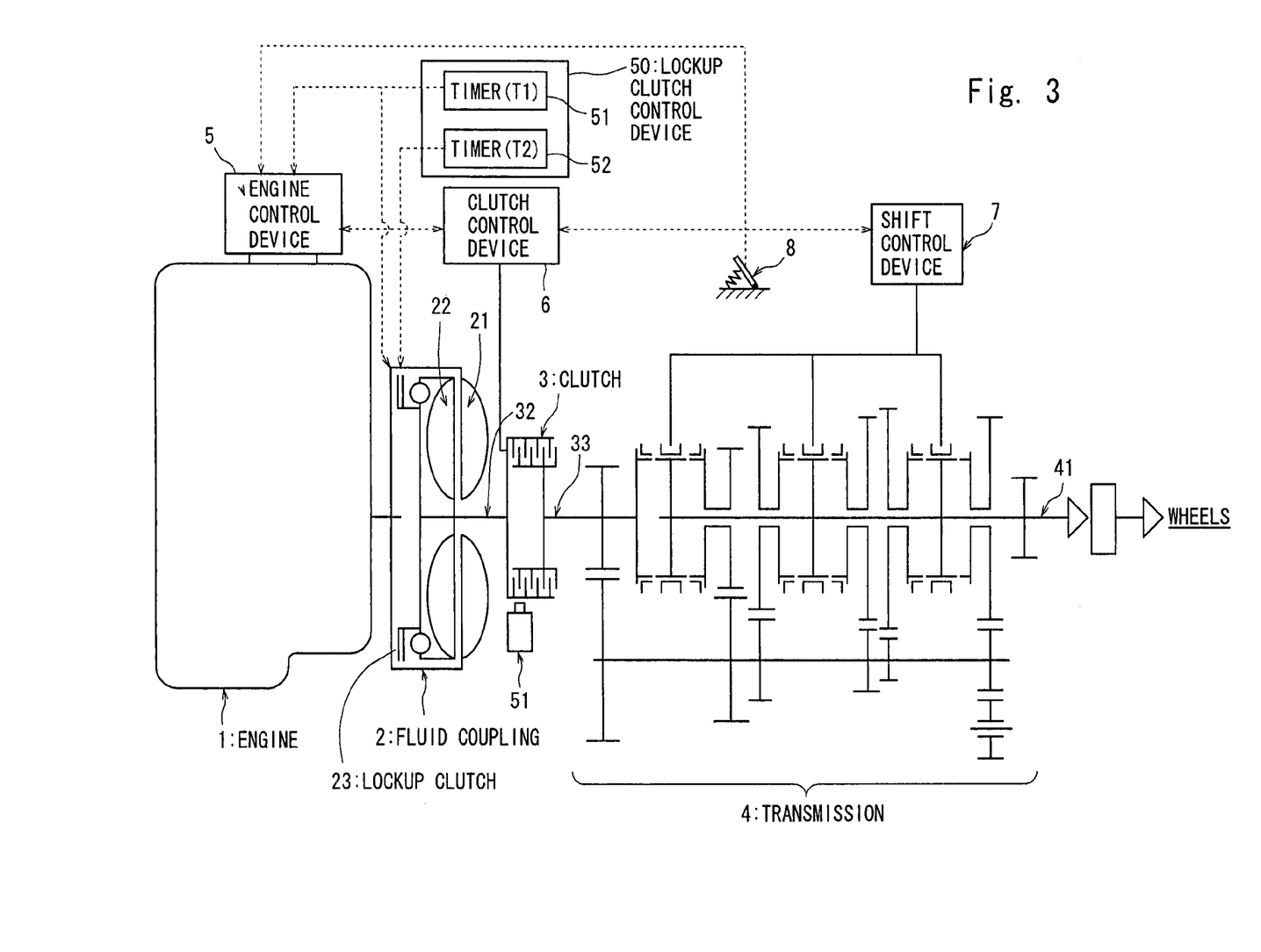
FIG. 3 is a view of a whole constitution of a power transmission device and control devices therefore of a vehicle (automobile).

Referring to FIG. 3 illustrating a whole constitution of a power transmission device and control devices therefore in a vehicle (automobile) according to the embodiment of the invention, the power transmission device is constituted by an engine (diesel engine) 1 equipped with a variable capacity exhaust turbocharger 200 that will be described later, a fluid coupling 2, a clutch 3 which is a wet multiple disk clutch, and a transmission 4 that are coupled in the axial direction.

A pump 21 of the fluid coupling 2 is coupled to an output shaft 1a of the engine 1, and an input shaft 32 of the clutch 3 is coupled to the output side of a turbine 22 that faces the pump 21.

An output shaft 33 of the clutch 3 is connected to the input side of the transmission 4, and an output shaft 41 of the transmission 4 is coupled to the wheels that are not shown.

The fluid coupling 2 incorporates a lockup clutch 23 which connects the pump 21 coupled to the output shaft 1a of the engine 1 to the turbine 22 that is coupled to the input shaft 32 of the clutch 3. The lockup clutch 23 is connected except the start of the vehicle, and the pump 21 on the side of the output shaft 1a of the engine 1 is directly coupled to the turbine 22 on the side of the input shaft 32 of the clutch 3.

The control device of the vehicle is constituted by an engine control device 5 for controlling the engine 1, a clutch control device 6 for controlling the operation of the clutch 3 that connects/disconnects the transmission of power between the engine 1 and the transmission 4, and a shift control device 7 for controlling the operation of the transmission 4. The engine control device 5, clutch control device 6 and transmission 4 operate being linked to each other.

As one of the control devices of the vehicle, further, there is provided a lockup clutch control device 50 for controlling the connection/disconnection of the lockup clutch 23. The lockup clutch control device 50 can be provided, for example, in the shift control device 7.

When the rotational speed of the input shaft of the transmission 4 reaches a rotational speed for holding the condition for connecting the lockup clutch 23 (when the condition for connecting the lockup clutch 23 is held), the lockup clutch control device 50 produces a control instruction to the engine control device 5 of the engine 1 to execute the operation by decreasing the target engine rotational speed down to a preset rotational speed. The lockup clutch control device 50 includes a timer (T1) 51 (first timer means) for setting a rotational speed decrease control time in which the engine 1 runs by decreasing the target rotational speed, and a timer (T2) 52 (second timer means) for setting a lockup start standby time from when the condition for connecting the lockup clutch 23 is held until when the lockup clutch 23 starts connecting.

Figure 4:
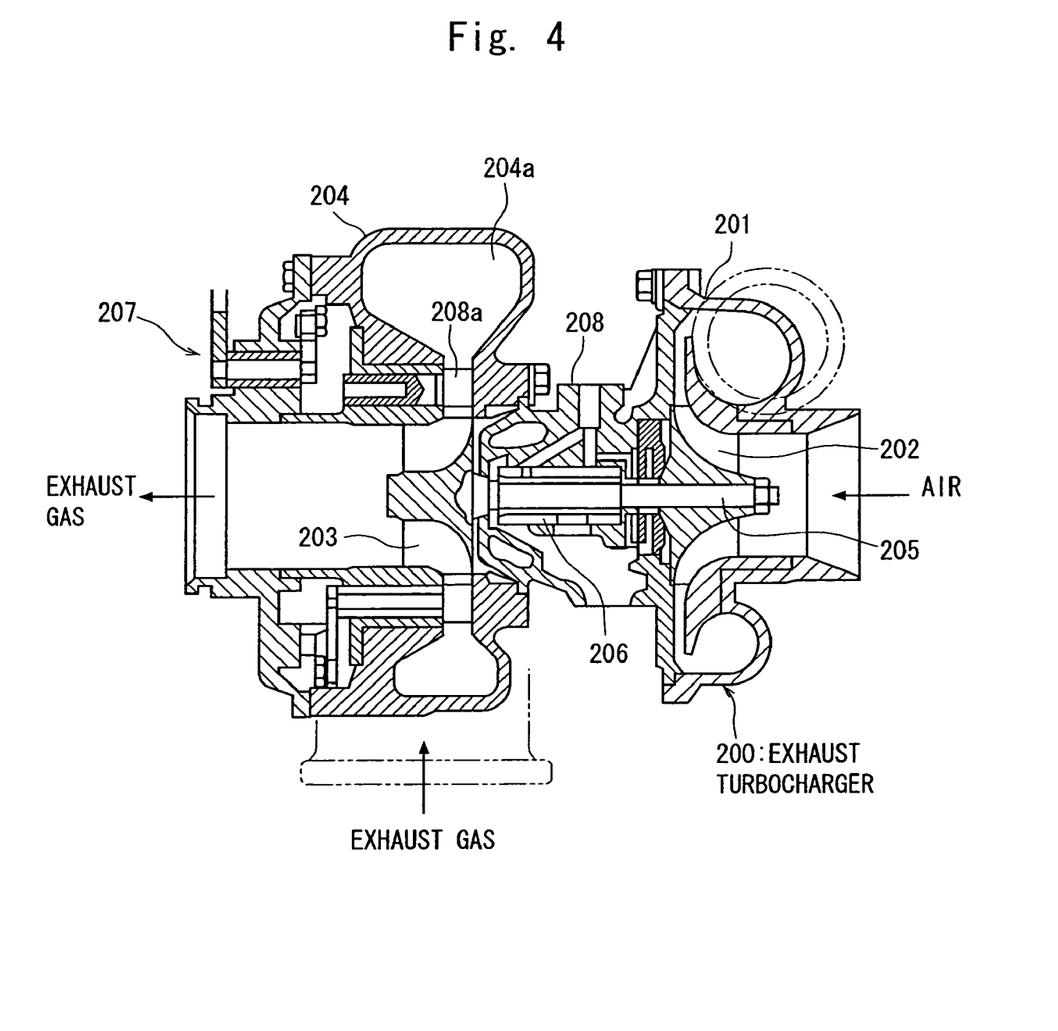
FIG. 4 is a sectional view of a variable capacity exhaust turbocharger.

The variable capacity discharge turbocharger 200 fitted to the engine 1 is constituted as shown in FIG. 4, and includes a turbine 203 held in a turbine housing 204, a compressor 202 held in a compressor housing 201, and a turbine shaft 205 for coupling the turbine 203 and the compressor 202 together.

Between the turbine housing 204 and the compressor housing 201, a bearing box 208 is arranged for fixing a bearing 206 that rotatably supports the turbine shaft 205. The turbine housing 204, bearing box 208 and compressor housing 201 are fixed by using a plurality of bolts.

In the variable capacity exhaust turbocharger, the turbine 203 is rotated by the exhaust gas through a nozzle 208a, the exhaust gas being introduced into a scroll passage 204a of the turbine housing 204 from the engine 1, whereby the air is compressed by the rotation of the turbine 203 and the compressor 202 attached to the turbine shaft 205 in concentric, and is fed as the intake air into the cylinders of the engine 1.

To vary the capacity of the exhaust turbocharger, a variable nozzle mechanism 207 is operated by a nozzle drive device that is not shown to vary the vane angle of the nozzle 208a.

Next, operation of the lockup clutch control device 50 will be described with reference to FIG. 1 to FIG. 3.

Figure 1:
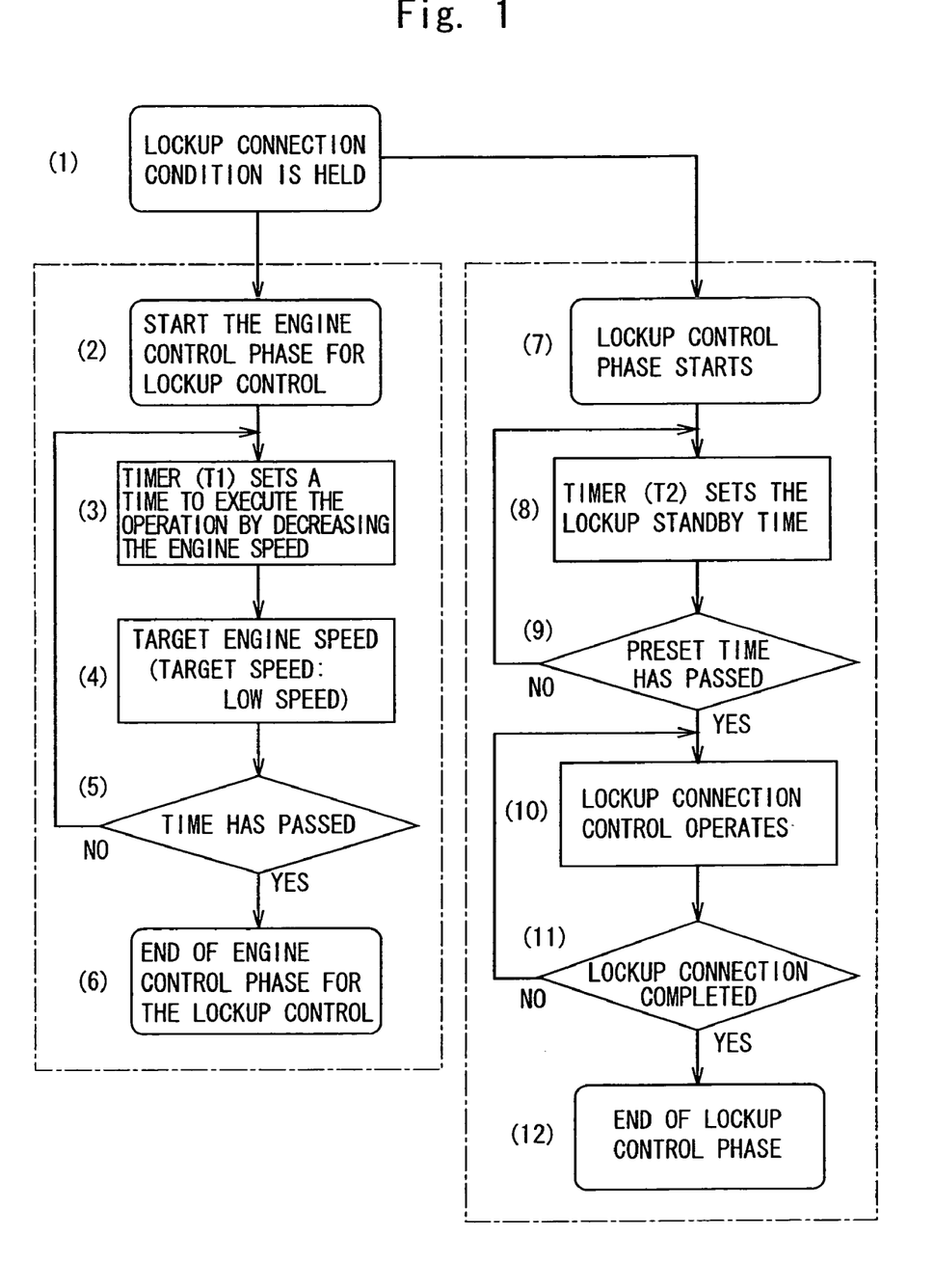
FIG. 1 is a flowchart for controlling a lockup clutch control device for a vehicle according to the present invention.

After the start of the vehicle in FIG. 1, when the condition for connecting the lockup clutch 23 is held, i.e., when the rotational speed of the input shaft of the transmission 4 reaches a rotational speed for holding the condition (e.g., 900 RPM) for connecting the lockup clutch 23 (step (1)), the engine control device 5 starts an engine control phase for lockup control (step (2)).

The lockup clutch control device 50 outputs to the engine control device 5 of the engine 1 a control instruction or an engine rotational speed request for executing the operation by decreasing the target engine rotational speed down to a preset rotational speed, and actuates the timer (T1) 51 to set a rotational speed decrease control time to execute the operation by decreasing the target rotational speed down to the preset rotational speed (step (3)). The target rotational speed of the engine 1 in the rotational speed decrease control time is determined depending upon the rotational speed of the input shaft of the transmission 4 and the like (step (4)).

After the lockup clutch control device 50 has output the instruction for decreasing the rotational speed, the timer (T1) 51 starts counting the time and decides if the rotational speed decrease control time set by the timer (T1) 51 has passed (step (5)). If the time has not been passed, the operation is continued by decreasing the target engine rotational speed down to the preset rotational speed. If the time set by the timer (T1) 51 has been passed, the engine control phase for the lockup control ends (step (6)).

On the other hand, simultaneously with the holding of the condition for connecting the lockup clutch 23, the lockup clutch control device 50 starts the lockup control phase for connecting the lockup clutch (step (7)).

In the lockup control phase, first, the lockup clutch control device 50 actuates the timer (T2) 52 to set the lockup start standby time from when the condition for connecting the lockup clutch 23 is held until when the lockup clutch 23 is connected so as to wait for the start of connection of the lockup clutch 23 (step (8)). Thereafter, it is decided if the time set by the timer (T2) 52 has passed (step (9)). At a moment when the end of the set time is identified, the lockup clutch control device 50 starts the control for connecting the lockup clutch 23 (step (10)).

Next, it is identified if the connection of the lockup clutch 23 is completed (step (11)). If the connection of the lockup clutch 23 has been completed, the lockup control phase ends (step (12)). If the lockup clutch 23 has not been connected, the control for connecting the lockup clutch 23 continues.

Figure 2:
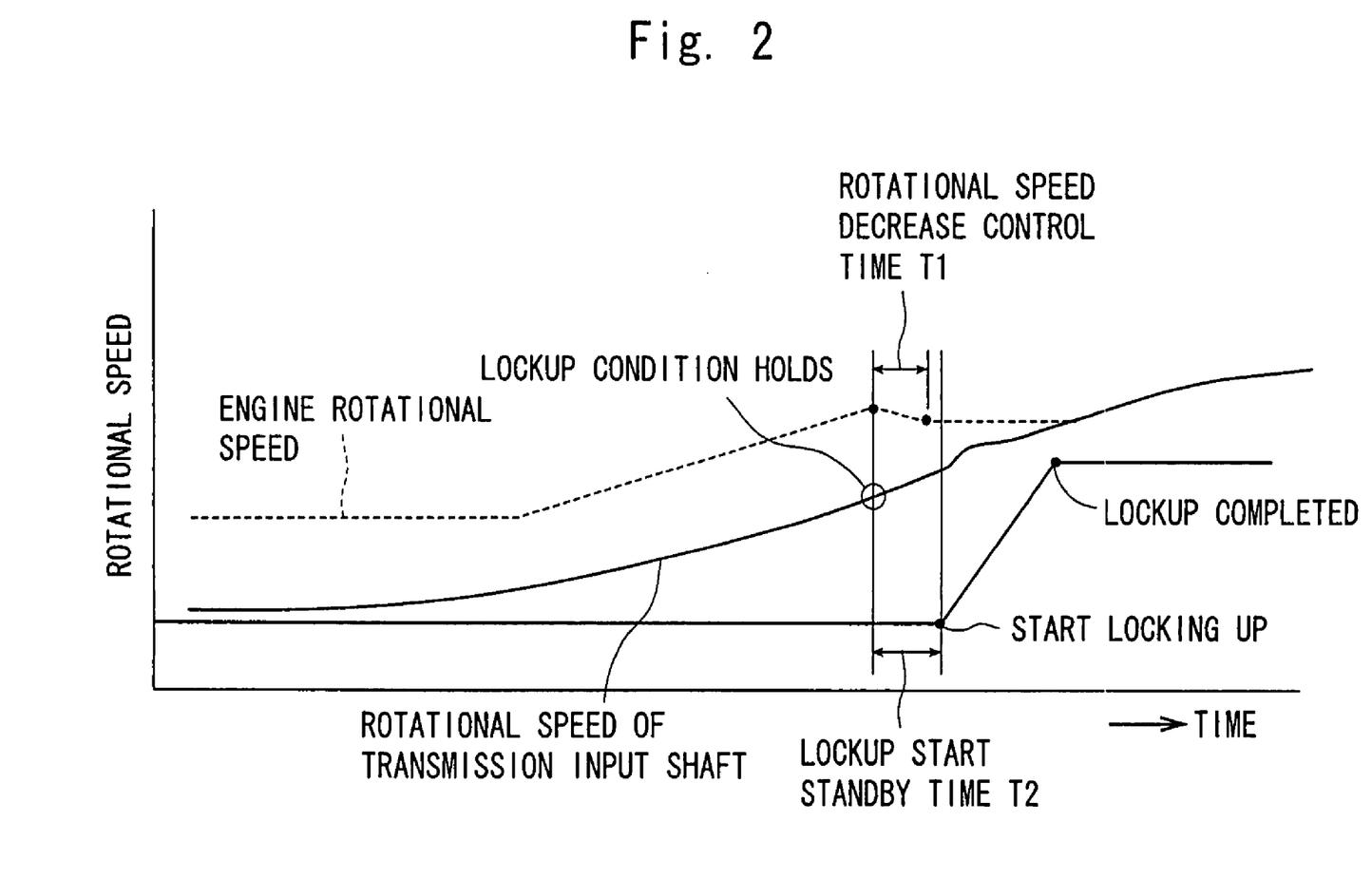
FIG. 2 is a diagram of control timings of a control device according to an embodiment of the invention.

According to the above embodiment as shown in FIG. 2, when the rotational speed of the input shaft of the transmission 4 reaches the rotational speed for holding the condition for connecting the lockup clutch 23, the lockup clutch control device 50 outputs to the engine control device 5 that controls the engine 1 equipped with the variable capacity exhaust turbocharger 200 the control instruction for executing the operation by decreasing the target engine rotational speed down to the preset rotational speed, and actuates the timer (T1) 51 (first timer means) to set a rotational speed decrease control time for executing the operation by decreasing the target engine rotational speed after the condition for connection has been held.

During the rotational speed decrease control time set by the timer (T1) 51, the engine control device 5 produces a control instruction for decreasing the target engine rotational speed. Therefore, the amount of fuel fed to the engine is greatly limited, and the real rotational speed of the engine 1 gradually decreases. The energy of the exhaust gas acting on the exhaust turbocharger 200 decreases with decrease in the rotational speed and the output of the engine. Accordingly, the rotational speed of the exhaust turbocharger 200 decreases, and the ejection pressure and flow rate of the compressor 202 decrease, i.e., the intake air pressure and the intake air flow rate of the engine decrease prior to connecting the lockup clutch 23 (operation point shifts from A to A1 in FIG. 6).

Together with the engine rotational speed decrease control, further, the lockup clutch control device 50 causes the timer (T2) 52 (second timer means) to wait for the start of lockup from when the condition for connecting the lockup clutch 23 is held until when the lockup clutch 23 starts connecting. The engine rotational speed decreases by a predetermined rotational speed at the start of lockup set by the timer (T2) 52. Since the engine rotational speed has been decreased in advance, the compressor 202 of the exhaust turbocharger 200 does not plunge into the surging region that is caused by an increase in the pressure in the engine intake air system despite the rotational speed is further decreased by the lockup (operation point shifts from A1 to C in FIG. 6). Namely, the lockup clutch can be connected at a moment of a proper engine rotational speed that is not adversely affected by the lockup.

Unlike that of the prior art, therefore, the exhaust turbocharger 200 is prevented from plunging into the surging region that is caused by a sharp decrease in the engine rotational speed and an increase in the pressure in the engine intake air system at the time when the lockup clutch 23 is connected, occurrence of noise such as surging noise due to surging is prevented, and the compressor vanes and the turbine vanes in the exhaust turbocharger 200 are prevented from being broken down.

Industrial Applicability

The above embodiment has described a power transmission device using a fluid coupling 2 as the fluid transmission device. However, locking up has also been effected in AT vehicles, too, that use a torque converter as the fluid transmission device. Therefore, the present invention can be applied to the AT vehicles as well.

In the above embodiment, further, the invention was applied to the vehicle mounting the engine equipped with the variable capacity exhaust turbocharger 200. Not being limited thereto only, however, the invention can also be applied to the vehicles mounting the engine equipped with the exhaust turbocharger and having a lockup clutch.

The invention claimed is:

1. A lockup clutch control device for a lockup clutch in a fluid transmission device which is arranged between an engine equipped with an exhaust turbocharger and a transmission on a vehicle, said lockup clutch connecting together a pump and a turbine in said fluid transmission device to directly transmit a power from the engine to the transmission,
    wherein said lockup clutch control device sets a rotational speed decrease control time when a rotational speed of an input shaft of the transmission reaches to a predetermined value and a condition for connecting said lockup clutch is held, and operates the engine to rotate at a decreased target rotational speed during said rotational speed decrease control time, and
    wherein said lockup clutch control device further sets a lockup start standby time, and starts the connection of said lockup clutch after said lockup start standby time has passed.

2. The lockup clutch control device according to claim 1, wherein said fluid transmission device comprises a fluid coupling.

3. The lockup clutch control device according to claim 1, wherein said exhaust turbocharger comprises a variable capacity exhaust turbocharger which comprises a variable nozzle mechanism.

4. The lockup clutch control device according to claim 2, wherein said exhaust turbocharger comprises a variable capacity exhaust turbocharger which comprises a variable nozzle mechanism.

5. The lockup clutch control device according to claim 1, wherein the lockup clutch control device comprises:
    a first timer that sets the rotational speed decrease control time for operating the engine by decreasing a target rotational speed when the condition for connecting said lockup clutch is held; and
    a second timer that sets the lockup start standby time from when the condition for connecting said lockup clutch is held until when the lockup clutch starts connecting.

6. The lockup clutch control device according to claim 5, wherein, when the rotational speed of the transmission input shaft reaches a rotational speed for holding the condition for connecting said lockup clutch, the lockup clutch control device outputs a control instruction to an engine control device of the engine to decrease the target rotational speed down to the decreases target rotational speed, and the lockup clutch control device actuates the first timer to set the rotational speed decrease control time for decreasing the target rotational speed down to the decreases target rotational speed after the condition for connecting said lockup clutch is held.

7. The lockup clutch control device according to claim 6, wherein the target rotational speed in the rotational speed decrease control time is determined depending upon the rotational speed of the input shaft of the transmission.

8. The lockup clutch control device according to claim 1, wherein the lockup clutch control device comprises a timer that sets the rotational speed decrease control time,
    wherein, after the lockup clutch control device outputs an instruction for decreasing the rotational speed of the input shaft, the timer starts counting time, and
    wherein, when a time set by the timer is passed, an engine control phase for the lockup control ends.

* * * * *